(12) United States Patent
Child et al.

(10) Patent No.: US 6,556,995 B1
(45) Date of Patent: Apr. 29, 2003

(54) METHOD TO PROVIDE GLOBAL SIGN-ON FOR ODBC-BASED DATABASE APPLICATIONS

(75) Inventors: Garry Lee Child, Austin, TX (US); Janani Janakiraman, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/442,695

(22) Filed: Nov. 18, 1999

(51) Int. Cl.$^7$ .............................. G06F 17/30; G06F 7/00
(52) U.S. Cl. ...................... 707/9; 707/7; 707/2; 707/10
(58) Field of Search ................ 707/1–10, 100–104.1

(56) References Cited

U.S. PATENT DOCUMENTS

| | | | | |
|---|---|---|---|---|
| 4,714,992 A | * | 12/1987 | Gladney et al. | 707/206 |
| 5,349,642 A | * | 9/1994 | Kingdon | 380/28 |
| 5,455,945 A | * | 10/1995 | VanderDrift | 707/2 |
| 5,572,709 A | | 11/1996 | Fowler et al. | 395/500 |
| 5,577,241 A | * | 11/1996 | Spencer | 707/5 |
| 5,689,698 A | * | 11/1997 | Jones et al. | 395/604 |
| 5,706,427 A | * | 1/1998 | Tabuki | 713/201 |
| 5,710,918 A | * | 1/1998 | Lagarde et al. | 707/10 |
| 5,721,908 A | * | 2/1998 | Lagarde et al. | 707/10 |
| 5,818,936 A | * | 10/1998 | Mashayekhi | 713/152 |
| 5,873,083 A | * | 2/1999 | Jones et al. | 707/4 |
| 5,913,025 A | * | 6/1999 | Higley et al. | 395/187.01 |
| 5,987,454 A | * | 11/1999 | Hobbs | 707/4 |
| 6,023,698 A | * | 2/2000 | Lavey, Jr. et al. | 707/10 |
| 6,085,223 A | * | 7/2000 | Carino, Jr. et al. | 709/203 |
| 6,092,196 A | * | 7/2000 | Reiche | 705/52 |
| 6,115,744 A | * | 9/2000 | Robins et al. | 709/203 |
| 6,237,023 B1 | * | 5/2001 | Yoshimoto | 709/201 |
| 6,275,941 B1 | * | 8/2001 | Saito et al. | 713/175 |

OTHER PUBLICATIONS

Welcome to the ODBC Section of the Microsoft Universal Data Access Web Site; www.microsoft.com; pp. 1.
Data Access Roadmap; A Technology report from Ken North; http://cbr.nc.us.mensa.org pp. 1–2.
ODBC Reality and Developer Experiences; DBMS Online; Mar. 1994; pp. 1–3.
ODBC (Open Database Connectivity); www.whatis.com; pp 1.
Understanding Multidatbase APIs and ODBC; DBMS Online; Mar. 1994; pp. 1–8.

* cited by examiner

Primary Examiner—Greta Robinson
Assistant Examiner—Linh Black
(74) Attorney, Agent, or Firm—Duke W. Yee; Leslie A. Van Leeuwen; Stephen J. Walder, Jr.

(57) ABSTRACT

A method in a data processing system for managing multiple identities for a single user. In a preferred embodiment, a request for content from a database is received at a server. Responsive to a determination that retrieval of the content from the database requires providing the database with user information, the user's database identity is retrieved from a library of database identities. The retrieved user identity information is then inserted into the request and the request is forwarded to the database.

21 Claims, 3 Drawing Sheets

METHOD TO PROVIDE GLOBAL SIGN-ON FOR ODBC-BASED DATABASE APPLICATIONS

CROSS REFERENCE TO RELATED APPLICATION

The present application is related to copending U.S. patent application Ser. No. 09/442,694 (entitled "Flexible Encryption Scheme for GSO Target Passwords") filed even date herewith. The above mentioned patent applications are assigned to the assignee of the present invention. The content of the cross referenced copending application is hereby incorporated herein by reference.

BACKGROUND OF THE INVENTION

1. Technical Field

The present invention relates to the field of computer software and, more particularly, to methods and apparatus to manage multiple user identities such that the user need only maintain a single user identity.

2. Description of Related Art

As computers have infiltrated society over the past several decades and become more important in all aspects of modern life, more and more confidential information has been stored on computer databases. However, computers and networks such as the Internet allow multitudes of users to access databases. Many times multiple databases may be accessed via the same network, but not all users on the network need or should have access to every database. Therefore, security devices have been implemented to prevent unauthorized access to a database.

One method of preventing unauthorized access is to require the user to provide user identification information to verify that that user is entitled to the information contained in the database. Thus, many database applications require a user to provide identification information, such as a user ID and password, in order to access a protected database. These applications may have this information fixed within the application (i.e., "hard coded"), the application may be configured with the information, or, in some cases, the application may prompt the user for this information at run time.

However, databases are not the only computer resources requiring a user to provide identifying information. Other resources such as servers and networks may also require users to provide identifying information. Because different resources have different security requirements and because some resources assign identities rather than allowing a user to choose, many users may have multiple identities depending on the particular resource that they are accessing. The database identity is yet another one that the user must maintain.

Global Sign-on (GSO) technology attempts to manage this set of multiple identities on behalf of a user so that the user only needs to maintain a single user identity. The user then allows the GSO to manage the other identities automatically whenever the user attempts to access a particular protected resource.

Current versions of GSO use a product technology referred to as Open Horizon to provide a single sign-on capability for databases. Open Horizon forwards all requests through a DCE client RPC mechanism to an Open Horizon server. The actual database request is then issued by the Open Horizon server. This technique requires a DCE client to be installed and configured on the client machine as well as the Open Horizon server to be installed and configured on the database server machine. However, it is desirable to have a global sign-on system that does not require any additional special client software to be installed and configured on the client machine. It is also desirable to have a global sign-on system that does not require an additional server.

SUMMARY OF THE INVENTION

The present invention provides a method in a data processing system for managing multiple identities for a single user. In a preferred embodiment, a request for content from a database, a service, or an application and a first user identity entered by a user is received at a database server. Responsive to a determination that retrieval of the content from the database requires providing the database with user information, the user's database identity or other information associated with the database is retrieved from a library of database identities on the GSO server. The retrieved user identity information is then inserted into the request and the request is forwarded to the database.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
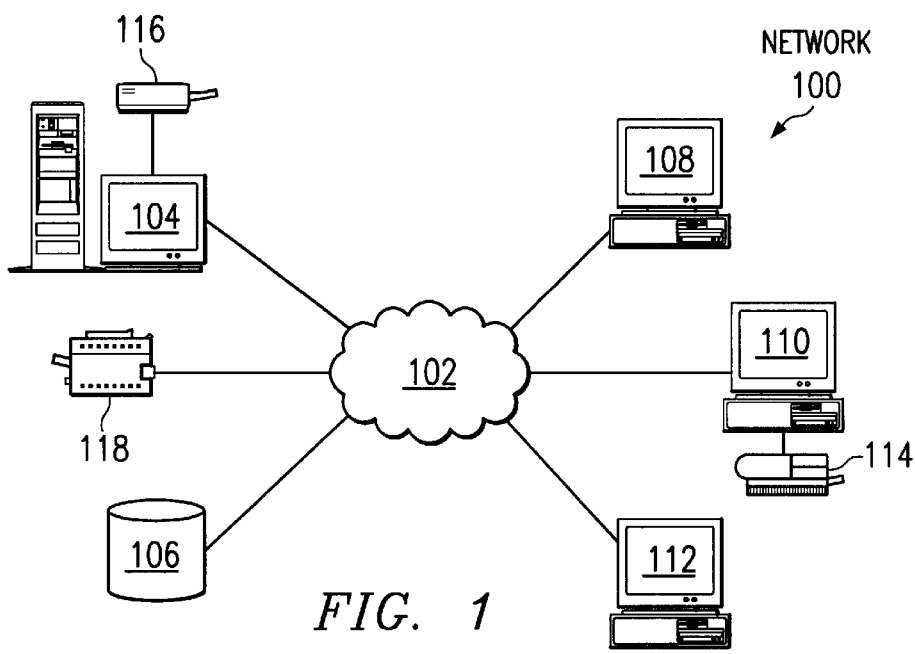
FIG. 1 depicts a pictorial representation of a distributed data processing system in which the present invention may be implemented.

With reference now to the figures, and in particular with reference to FIG. 1, a pictorial representation of a distributed data processing system is depicted in which the present invention may be implemented.

Distributed data processing system 100 is a network of computers in which the present invention may be implemented. Distributed data processing system 100 contains network 102, which is the medium used to provide communications links between various devices and computers connected within distributed data processing system 100. Network 102 may include permanent connections, such as wire or fiber optic cables, or temporary connections made through telephone connections.

In the depicted example, server 104 is connected to network 102, along with storage unit 106. In addition, clients 108, 110 and 112 are also connected to network 102. These clients, 108, 110 and 112, may be, for example, personal computers or network computers. For purposes of this application, a network computer is any computer coupled to a network which receives a program or other application from another computer coupled to the network. In the depicted example, server 104 provides data, such as boot files, operating system images and applications, to clients 108–112. Clients 108, 110 and 112 are clients to server 104. Distributed data processing system 100 may include additional servers, clients, and other devices not shown. Distributed data processing system 100 also includes printers 114, 116 and 118. A client, such as client 110, may print directly to printer 114. Clients such as client 108 and client 112 do not have directly attached printers. These clients may print to printer 116, which is attached to server 104, or to printer 118, which is a network printer that does not require connection to a computer for printing documents. Client 110, alternatively, may print to printer 116 or printer 118, depending on the printer type and the document requirements.

In the depicted example, distributed data processing system 100 is the Internet, with network 102 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages. Of course, distributed data processing system 100 also may be implemented as a number of different types of networks such as, for example, an intranet or a local area network.

FIG. 1 is intended as an example and not as an architectural limitation for the processes of the present invention.

Figure 2:
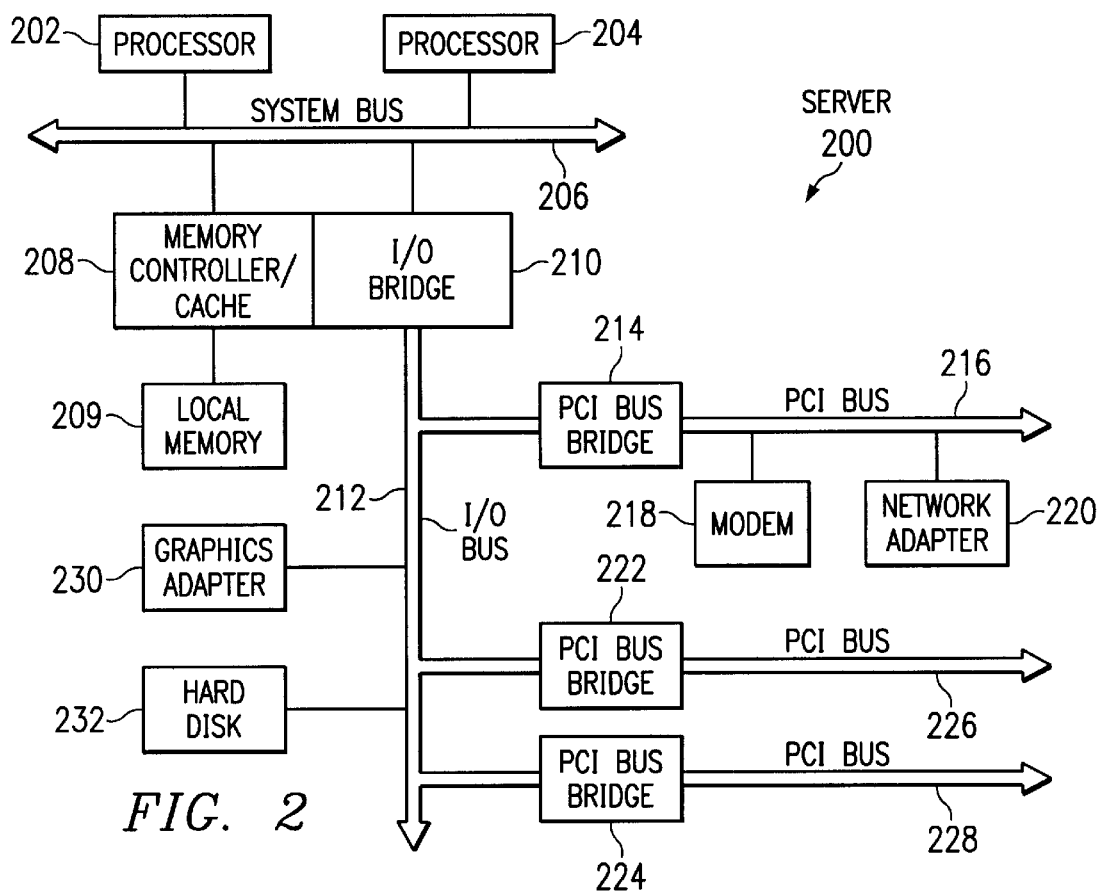
FIG. 2 depicts a block diagram of a data processing system which may be implemented as a server in accordance with the present invention.

Referring to FIG. 2, a block diagram of a data processing system which may be implemented as a server, such as server 104 in FIG. 1, is depicted in accordance with the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems 218–220 may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an Intel system running a Windows NT operating system.

Figure 3:
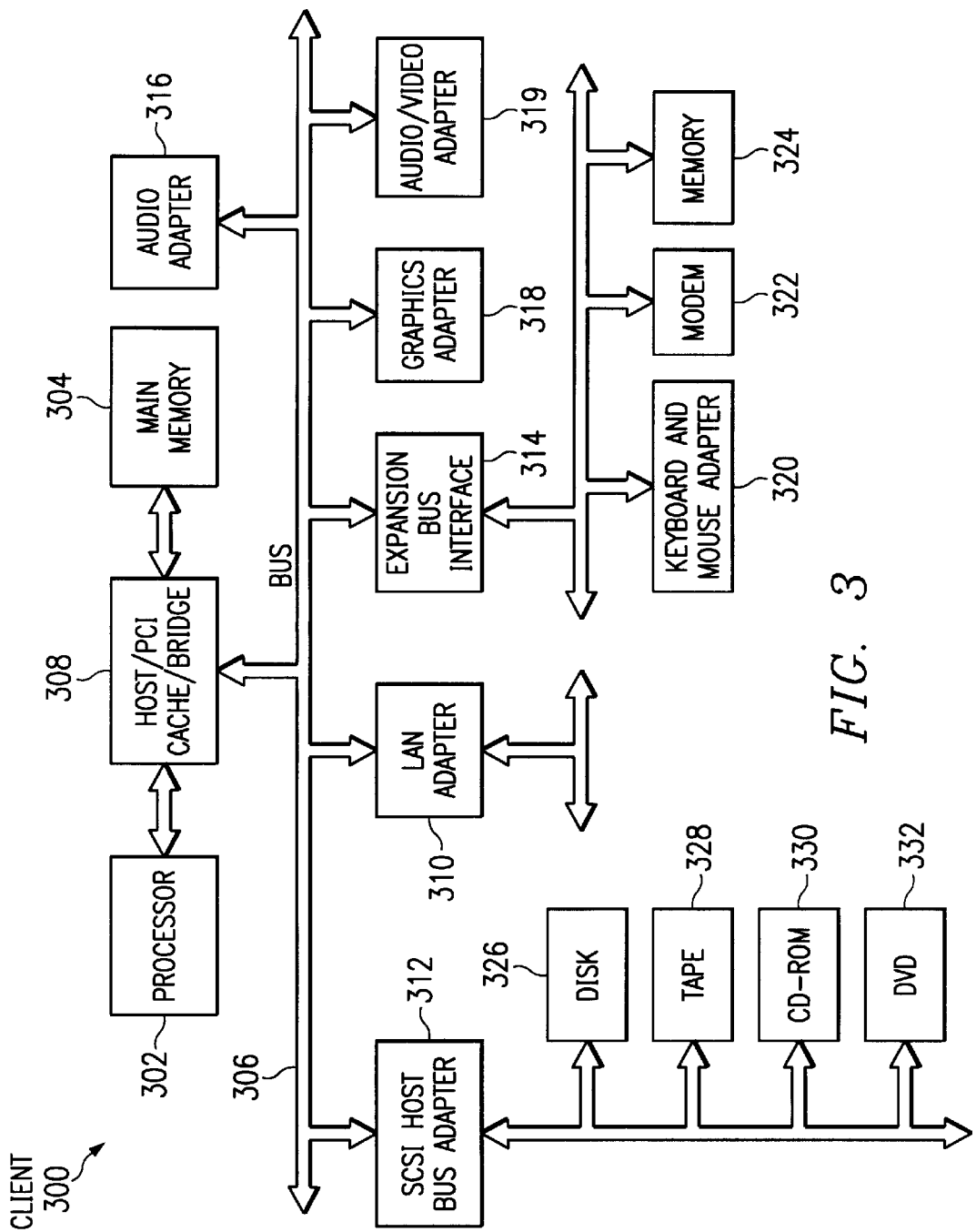
FIG. 3 depicts a block diagram of a data processing system in which the present invention may be implemented.

With reference now to FIG. 3, a block diagram of a data processing system in which the present invention may be implemented is illustrated. Data processing system 300 is an example of a client computer. Data processing system 300 employs a peripheral component interconnect (PCI) local bus architecture. Although the depicted example employs a PCI bus, other bus architectures, such as Micro Channel and ISA, may be used. Processor 302 and main memory 304 are connected to PCI local bus 306 through PCI bridge 308. PCI bridge 308 may also include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. In the depicted example, SCSI host bus adapter 312 provides a connection for hard disk drive 326, tape drive 328, CD-ROM drive 330, and digital video disc read only memory drive (DVD-ROM) 332. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as OS/2, which is available from International Business Machines Corporation. "OS/2" is a trademark of International Business Machines Corporation. An object oriented programming system, such as Java, may run in conjunction with the operating system, providing calls to the operating system from Java programs or applications executing on data processing system 300. Instructions for the operating system, the object-oriented operating system, and applications or programs are located on a storage device, such as hard disk drive 326, and may be loaded into main memory 304 for execution by processor 302.

Those of ordinary skill in the art will appreciate that the hardware in FIG. 3 may vary depending on the implementation. For example, other peripheral devices, such as optical disk drives and the like, may be used in addition to or in place of the hardware depicted in FIG. 3. The depicted example is not meant to imply architectural limitations with respect to the present invention. For example, the processes of the present invention may be applied to multiprocessor data processing systems.

Figure 4:
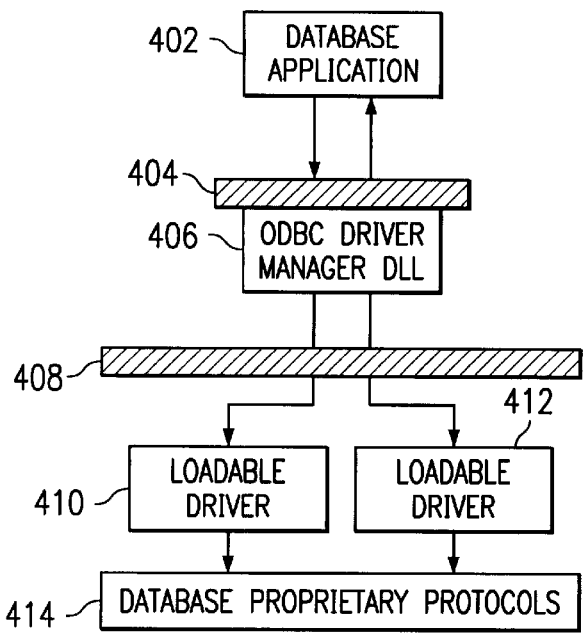
FIG. 4 depicts a block diagram illustrating a prior art ODBC architecture.

Turning now to FIG. 4, a block diagram illustrating a prior art Open Database Connectivity (ODBC) architecture is depicted. ODBC architecture provides an abstraction called a data source that encapsulates a server, database name, schema, network library, and other information for linking a client application with data. ODBC supports transaction commit and rollback, asynchronous processing, an option to cancel a query, stored procedures, primary and foreign keys, and five levels of transaction isolation.

A database application 402, which may reside on a client such as client 300, is connected through a network, such as network 100, to ODBC Driver Manager Dynamic Link Library (DLL) 406 via ODBC Application Programming Interface (API) 404. ODBC Driver Manager DLL 406 sits at a layer above Loadable Drivers 410 and 412. ODBC Driver Manager DLL 406 loads and unloads drivers 410 and 412, performs status checking, and manages multiple connections between applications and data sources. Loadable Drivers 410 and 412 may be single- or multiple-tier drivers. Single-tier drivers sit directly above a data source and process ODBC calls and Structure Query Language (SQL) statements. Multiple-tier drivers process the function calls and pass the SQL request to a server for processing. ODBC Driver Manager DLL 406 processes some ODBC calls without calling a driver.

ODBC Driver Manager DLL 406 processes the function calls from database application 402 and directs them to the appropriate one of loadable drivers 410 and 412 via ODBC Driver API 408. Loadable drivers 410 and 412 map the ODBC functions into calls to a library of proprietary functions contained in database proprietary protocols database 414.

In implementing a call to a database under this system, a user must enter user identification information for each database, application, or service that requires this information in order to process a request. Often, the user identification information is different for each entity, thus, a user must remember and enter multiple sets of user identification information during a computing session.

Figure 5:
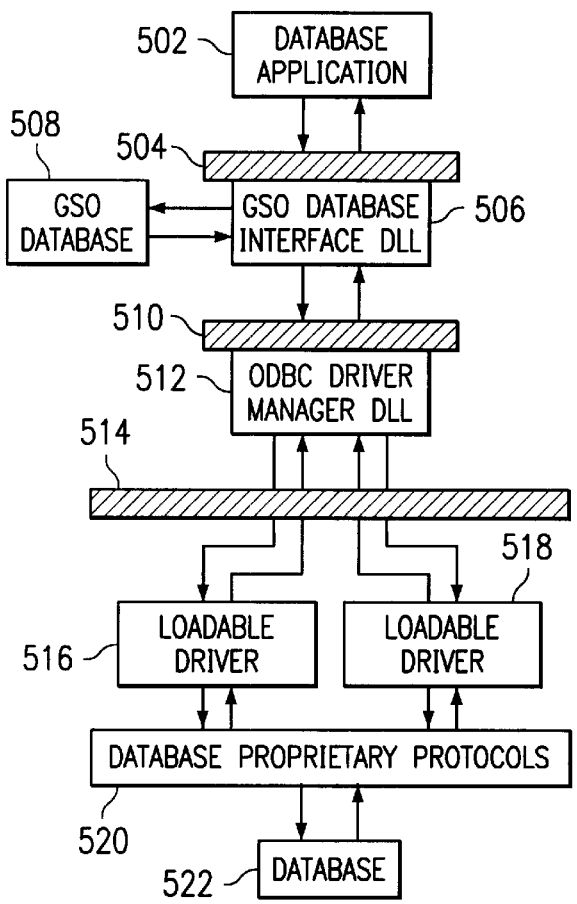
FIG. 5 depicts a block diagram illustrating a software architecture in which the present invention may be implemented.

Referring now to FIG. 5, a block diagram illustrating a software architecture in which the present invention may be implemented is depicted. By using this software architecture, a user may retrieve documents, applications, and other services by using a single main user identity or "logon". The user is not require to remember or enter any other user identities that may be required to access any of the multiple applications or databases that utilize different user identities than the main user identity. Such other identities are stored, retrieved and sent to the appropriate objects at appropriate times automatically using the method and system of the present invention.

In a preferred embodiment of the present invention, a Global Sign-on (GSO) database interface DLL 506 is placed between the Open Database Connectivity (ODBC) Application Program Interface (API) dynamic link library (DLL) 512 and database application 502. GSO database interface DLL 512 is a shared library that database application 502 uses to process ODBC requests. An ODBC API is an application programming interface that can operate with heterogeneous databases without requiring source code changes. Typically, database application 502 will be located on a client machine such as data processing system 300 which will be connected to GSO database interface DLL 506 via ODBC API 504 by way of a network such as network 100. GSO database interface DLL 506 is typically located on the same client machine as database application 502. Alternatively, GSO database interface DLL 506 could be located on a separate server using network sharing capability, but this is less typical.

When GSO database interface DLL 506 receives an API request from database application 502 via ODBC API 504, which requires a user identity, GSO database interface DLL 506 accesses GSO database 508 to retrieve the user's database identity and inserts it into the database request. GSO database interface DLL 506 forwards the database request to ODBC Driver Manager DLL 512 through ODBC API 510.

For normal API requests which do not require a user's identity, GSO database interface DLL 506 forwards these requests to ODBC Driver Manager DLL 512 unchanged. Results from ODBC Driver Manager DLL 512 are returned to database application 502 normally. In this manner, GSO database interface DLL is transparent to database application 502 and yet the user's identity is automatically filled in on behalf of the user whenever the user executes a database application.

ODBC Driver Manager DLL 512 fields the database request (or call) from database application 502. ODBC Driver Manager DLL 512 sits at a layer above loadable drivers 516, 518 and loads and unloads drivers 516, 518 through ODBC Driver API 514, performs status checking, and manages multiple connections between applications and data sources. Loadable drivers 516, 518 may be single-or multiple-tier drivers. Single tier drivers sit directly above a data source and process ODBC calls and the structured query language (SQL) statements. Multiple-tier drivers process the function calls and pass the SQL request to a server for processing. Driver Manager 512 fields and processes some ODBC calls without calling a driver.

In either scenario (single- or multiple-tier), ODBC Driver Manager DLL 512 processes the function calls of database application 502 and directs them to the appropriate one of loadable drivers 516, 518. Loadable drivers 516, 518 map the ODBC functions into calls to a library of proprietary functions or database proprietary protocols 520. Database 522 receives the request, retrieves the appropriate content and sends it back to database application 502.

GSO database interface DLL 506 provides an identical set of APIs as ODBC Driver Manager DLL 512 so that database application 502 works normally. The APIs provided by GSO database interface DLL 506 have the same signature and ordinals. GSO database interface DLL 506 dynamically loads the "real" ODBC API DLL 512 so that its use is completely transparent to database application 502. GSO database interface DLL 506 has the same name as ODBC DLL 512. Database application 502 can continue to use either run time linking or load time linking to access GSO database interface DLL 506. When GSO database interface DLL 506 is installed and configured, it ensures that the operating system will resolve links to the ODBC DLL 512 to it first. It does this by updating PATH to point to GSO database interface DLL 506 first, before the real ODBC DLL 512 routine or by moving the ODBC DLL 512 to another location. GSO database interface DLL 506 is also configured to know where the "real" ODBC DLL 512 is located so that it can load it at run time.

Figure 6:
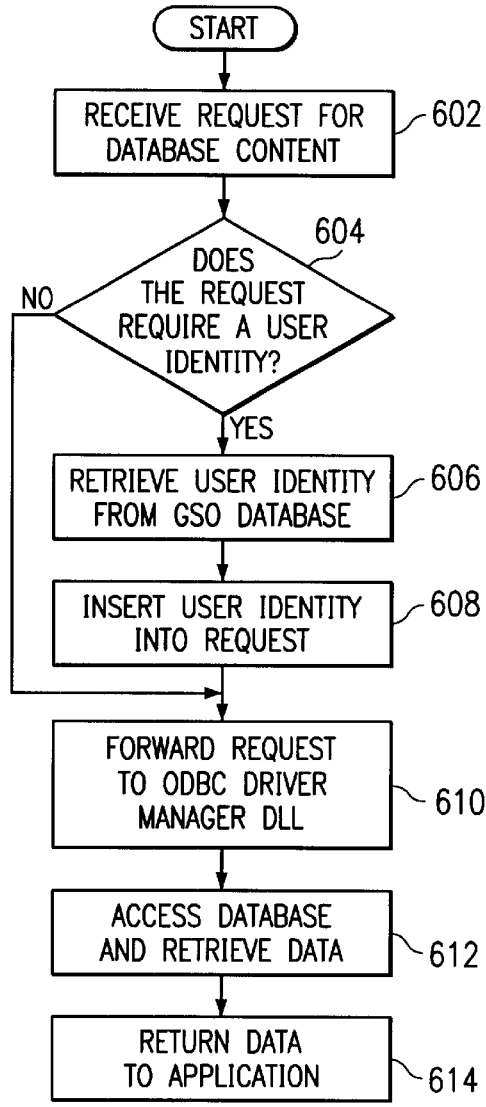
FIG. 6 depicts a flowchart illustrating the processes of the present invention.

Turning now to FIG. 6, a flowchart illustrating the processes of the present invention is depicted. To start, an application requests content from a database (step 602). The GSO database interface DLL intercepts the request and determines whether the request requires a user identity to access the information in the database (step 604). If the user identity is required to access the information in the database, then the GSO database interface DLL retrieves the identity information from the GSO database of user identities (step 606) and inserts this user identity into the request (step 608). Next, the GSO database interface DLL forwards the request to the ODBC Driver Manager DLL (step 610). The database containing the requested information is accessed and the data retrieved (step 612). The requested data is then returned to the requesting application (step 614).

If the request does not require a user identity to access information in the database, then the request is forwarded unmodified to the ODBC Driver Manager DLL (step 610), which then accesses the database and retrieves the requested data (step 612). The requested data is then returned to the requesting application (step 614).

Although the present invention has been described primarily with reference to database applications that utilize the Open Database Connectivity (ODBC) database API to access the database, the same technique could be used for any API that an application uses to access a database, such as, for example, the Java JDBC interface.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for managing multiple identities for a user, the steps comprising:
   receiving a request for content from a database;
   responsive to a determination that retrieval of said content from said database requires providing said database with user identification information, retrieving a database identity from a plurality of database identities, wherein the retrieved database identity corresponds to the user;
   inserting the retrieved database identity into said request;
   retrieving said requested content from said database; and
   sending said requested content to a requesting client.

2. The method as recited in claim 1, wherein the retrieved database identity comprises a user ID.

3. The method as recited in claim 1, wherein the retrieved database identity comprises a password.

4. The method as recited in claim 1, wherein said retrieving step and said inserting step is performed by a global sign-on database interface dynamic link library.

5. The method as recited in claim 1, further comprising:
   responsive to a determination that user identification information is not necessary to retrieve said content, forwarding said request to said database unmodified.

6. A method in a data processing system for managing multiple identities for a user, the steps comprising:
   receiving a request for content from a database;
   responsive to a determination that retrieval of said content from said database requires providing said database with user identification information, retrieving a database identity from a plurality of database identities, wherein the retrieved database identity corresponds to the user; and
   inserting the retrieved database identity into said request;
   wherein said request is received from a requesting application and said requesting application is an open database connectivity based application.

7. A method in a data processing system for managing multiple identities for a user, the steps comprising:
   receiving a request for content from a database;
   responsive to a determination that retrieval of said content from said database requires providing said database with user identification information, retrieving a database identity from a plurality of database identities, wherein the retrieved database identity corresponds to the user; and
   inserting the retrieved database identity into said request;
   wherein said request is received from a requesting application and said requesting application is a JAVA database connectivity based application.

8. A computer program product on a computer useable medium, for use in a data processing system for managing multiple identities for a single user, the computer program product comprising:
   first instructions for receiving a request for content from a database;
   second instructions, responsive to a determination that retrieval of said content from said database requires providing said database with user identification information, for retrieving a database identity from a plurality of database identities, wherein the retrieved database identity corresponds to the user;
   third instructions for inserting the retrieved database identity into said request;
   fourth instructions for retrieving said requested content from said database; and
   fifth instructions for sending said requested content to a requesting client.

9. The computer program product as recited in claim 8, wherein the retrieved database identity comprises a user ID.

10. The computer program product as recited in claim 8, wherein the retrieved database identity comprises a password.

11. The computer program product as recited in claim 8, wherein said retrieving step and said inserting step is performed by a global sign-on database interface dynamic link library.

12. The computer program product as recited in claim 8, further comprising:
    responsive to a determination that user identification information is not necessary to retrieve said content, forwarding said request to said database unmodified.

13. A computer program product on a computer useable medium, for use in a data processing system for managing multiple identities for a single user, the computer program product comprising:
    first instructions for receiving a request for content from a database;
    second instructions, responsive to a determination that retrieval of said content from said database requires providing said database with user identification information, for retrieving a database identity from a plurality of database identities, wherein the retrieved database identity corresponds to the user; and
    third instructions for inserting the retrieved database identity into said request;
    wherein said request is received from a requesting application and said requesting application is an open database connectivity based application.

14. A computer program product on a computer useable medium, for use in a data processing system for managing multiple identities for a single user, the computer program product comprising:

first instructions for receiving a request for content from a database;

second instructions, responsive to a determination that retrieval of said content from said database requires providing said database with user identification information, for retrieving a database identity from a plurality of database identities, wherein the retrieved database identity corresponds to the user; and third instructions for inserting the retrieved database identity into said request;

wherein said request is received from a requesting application and said requesting application is a JAVA database connectivity based application.

15. An information handling system, comprising:

a library, containing a plurality of database identities;

a protected database, wherein user information must be provided to access said protected database;

means for receiving a request from a user for content from said protected database;

means for retrieving a particular database identity from said library, wherein said particular database identity corresponds to the user;

means for inserting the particular database identity into the request;

means for retrieving said requested content from said database; and means for sending said requested content to a requesting client.

16. The information handling system as recited in claim 15, wherein the retrieved database identity comprises a user ID.

17. The information handling system as recited in claim 15, wherein the retrieved database identity comprises a password.

18. The information handling system as recited in claim 15, wherein said retrieving step and said inserting step is performed by a global sign-on database interface dynamic link library.

19. The information handling system as recited in claim 15, further comprising:

responsive to a determination that user identification information is not necessary to retrieve said content, forwarding said request to said database unmodified.

20. An information handling system, comprising:

a library, containing a plurality of database identities;

a protected database, wherein user information must be provided to access said protected database;

means for receiving a request from a user for content from said protected database;

means for retrieving a particular database identity from said library, wherein said particular database identity corresponds to the user; and means for inserting the particular database identity into the request;

wherein said request is received from a requesting application and said requesting application is an open database connectivity based application.

21. An information handling system, comprising:

a library, containing a plurality of database identities;

a protected database, wherein user information must be provided to access said protected database;

means for receiving a request from a user for content from said protected database;

means for retrieving a particular database identity from said library, wherein said particular database identity corresponds to the user; and means for inserting the particular database identity into the request;

wherein said request is received from a requesting application and said requesting application is a JAVA database connectivity based application.

* * * * *